United States Patent [19]

Greco

[11] 4,382,019

[45] May 3, 1983

[54] PURIFIED CATALYST SUPPORT

[75] Inventor: Carl C. Greco, Garnerville, N.Y.

[73] Assignee: Stauffer Chemical Company, Westport, Conn.

[21] Appl. No.: 300,774

[22] Filed: Sep. 10, 1981

[51] Int. Cl.³ .............................. C08F 4/64; C08F 4/02
[52] U.S. Cl. .................................. 252/429 B; 252/441; 526/125; 423/498
[58] Field of Search ............................ 252/441, 429 B; 423/498

[56] References Cited

U.S. PATENT DOCUMENTS

| | | | |
|---|---|---|---|
| 3,412,174 | 11/1968 | Kroll | 252/429 B X |
| 4,085,276 | 4/1978 | Toyota et al. | 252/429 B X |
| 4,149,990 | 4/1979 | Giannini et al. | 252/429 B |
| 4,186,107 | 1/1980 | Wagner | 252/429 B |
| 4,243,552 | 1/1981 | Welch et al. | 252/429 B |
| 4,312,782 | 1/1982 | Mink et al. | 252/429 B |

Primary Examiner—Patrick Garvin

[57] ABSTRACT

This invention relates to pretreating the support material for a polymerization catalyst comprising magnesium chloride with an active hydrogen compound such as an organic acid phosphate or a phenol in order to transform substantially elemental magnesium and other impurities. The impure magnesium chloride originates as a by-product from the manufacture of magnesium alkyls by the reaction of alkyl chlorides with elemental magnesium. Succeeding steps are activating the support material with an electron donor and treating the activated product with a titanium halide.

The invention also includes the novel catalytic component containing titanium halide, itself, the process for making that component, use of this catalytic system for polymerizing olefins such as propylene, and the purification step for magnesium chloride, itself.

32 Claims, No Drawings

PURIFIED CATALYST SUPPORT

BACKGROUND OF THE INVENTION

This invention relates to magnesium chloride. More particularly it relates to magnesium chloride employed as a support material for the titanium-containing component in a coordination complex (Ziegler-Natta) catalytic system for the polymerization of olefins. Magnesium chloride is a favored support material for such polymerization catalysts, as disclosed, for example in U.S. Pat. No. 3,642,746 granted to Kashiwa et al.

Magnesium alkyls are useful reagents in organic reductions, metalation of aromatic compounds, alkylating agents, and catalysts. As disclosed in U.S. Pat. No. 4,127,507 granted to Fannin and Malpass magnesium alkyls may be prepared by the reaction of alkyl chlorides with magnesium metal, but in this process impure magnesium chloride is formed as an inevitable by-product. Hitherto there has been no effective means for transforming the waste, by-product magnesium chloride generated by the production of magnesium alkyls into a grade of magnesium chloride generally useful in industry as a support material suitable for the catalyst for the polymerization of olefins. Magnesium chloride is also useful in the preparation of oxychloride cements, as a fireproofing agent for wood timbers, as a dustbinder cleaning component, and in refrigeration brines.

U.S. Pat. No. 4,180,636 to Hirota et al. discloses a process for preparing a catalytic component for polymerizing olefins by copulverizing magnesium dihalide, aroyl chloride, titanium halide, and an electron donor. Among the recommended electron donors are phosphinites, phosphites, chlorophosphites, phosphinates, phosphonates, phosphates, and phosphine oxides. Other electron donors include phenols and naphthols.

U.S. Pat. No. 4,243,552 to Welch et al. discloses copulverization of a magnesium or manganese halide with selected adjuvants followed by treatment with a tetravalent titanium halide. Among the adjuvants listed are organophosphites, organophosphates, and phenols.

Japanese Pat. No. 2,032,985 to Nippon Oil KK discloses a component for an olefin polymerization catalyst prepared by copulverizing magnesium chloride, a hydrocarbyl phosphite, titanium tetrachloride, and titanium trichloride.

U.S.S.R. Pat. No. 667,232 to Makhtarulin discloses a catalyst for polymerizing ethylene obtained by post-treating with titanium tetrachloride a complex magnesium alkyl and magnesium chloride prepared from magnesium metal and an alkyl chloride.

It is an object of this invention to yield a catalyst support for use in the polymerization of an olefin in such a manner that a high weight of polymer is produced for each gram of catalyst, so that a deashing step can be omitted. It is a further object of this invention to provide a polymerization catalyst for olefins which gives a high isotactic index for the polymer produced.

Additionally, it is an object of this invention to provide an effective catalyst support of magnesium dichloride from an impure magnesium dichloride by-product, originally containing an unacceptable amount of elemental magnesium.

Still another object of the present invention is to provide a process for preparing magnesium chloride of polymerization catalysis grade from a by-product material from the manufacture of magnesium alkyls.

An additional object of this invention is to provide a process for making commercially useful magnesium chloride from an impure by-product of little value.

Other objects of the present invention will be apparent to those skilled in the art.

SUMMARY OF THE INVENTION

It has been found that contacting an impure magnesium chloride by-product, containing several percent magnesium metal, with an active hydrogen compound, such as an organic acid phosphate or a phenol, transforms substantially the magnesium metal. After such contacting, surprisingly, the refined magnesium chloride can be employed for various commercial uses including that of support material for the titanium-containing component of a coordinate complex (Ziegler-Natta) catalytic system. The preferred method for preparing the catalytic component comprises:

(i) contacting the support material comprising magnesium chloride with an active hydrogen compound such as an organic acid phosphate or a phenol in order to transform substantially the elemental magnesium to make a purified support, (ii) activating the purified support with an electron donor to make an activated product, and (iii) treating the activated product with a titanium halide to form the component containing titanium.

Other aspects of the present invention are the composition of the titanium-containing component and the use of the titanium-containing component with an organoaluminum compound as a catalytic system for polymerizing olefins with high activity and yielding polymer with a high isotactic index.

DETAILED DESCRIPTION OF THE INVENTION

Magnesium alkyls may be prepared by the reaction of alkyl halides with powdered magnesium metal in a hydrocarbon solvent to produce not only the organo-metallic compound but also magnesium halide as a by-product:

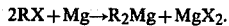

$$2RX + Mg \rightarrow R_2Mg + MgX_2.$$

Inevitably there are appreciable amounts of elemental magnesium in the insoluble magnesium halide. Since the reaction is not quantitative, the magnesium-containing sludge can easily have an elemental analysis as high as 10-15 percent magnesium metal. At the least there is from about 5 to about 9 percent magnesium metal in the magnesium halide sludge produced. Hithereto, this has generally been considered a waste material.

It has been found, however, that by intimately contacting this sludge of magnesium halide containing metallic impurities with an active hydrogen organic compound a refined magnesium halide is produced which is commercially useful. Particularly, the refined magnesium halide may by used as a support material for catalysts, especially the titanium-containing component of a heterogeneous polymerization (Ziegler-Natta) system.

By the term halide is meant any one of chlorides, bromides, fluorides, or iodides of magnesium. In fact, however, for economic reasons magnesium chloride is highly preferred.

By "intimately contacting" any process at the molecular or working particle level of matter is intended rather than mere mixing of diverse materials or phases. The preferred method of intimately contacting is by copulverization. Copulverization may be carried out in any suitable milling equipment such as a ball mill, a hammer mill, a vibratory mill, a grinding mill, or the like. Use of a ball mill is preferred, especially employing stainless steel balls, but ceramic, glass, or balls of other material may be substituted.

Active hydrogen compounds in the context of the present invention are those organic compounds with enough acidity to react with the magnesium, and organometals in the magnesium chloride sludge but not so much acidity that they would be termed strong acids. In quantitative terms active hydrogen compounds have dissociation constants from about $10^{-2}$ to about $10^{-10}$, that is they have a $pK_a$ of from about 2 to about 10. Active hydrogen compounds are found in such classes of organic compounds as certain hydrocarbyl acids such as acetic, benzoic, glutaric, cyclohexane carboxylic, and naphthoic; phenols such as phenol itself, nitrophenols, chlorophenols, hydroquinone, β-naphthol, cresol, and phenolphthalein; other acids such as picolinic, pyridine carboxylic, aminotoluic, anisic, aminobenzoic, allantoin, cacodylic, cysteine, cystine, and tryptophan; monohydrocarbyl diacid phosphates such as ethyl phosphate, butyl phosphate, and phenyl phosphate; dihydrocarbyl monoacid phosphates such as diethyl acid phosphate, dibutyl acid phosphates, and diphenyl acid phosphate; monohydrocarbyl phosphinic diacids; dihydrocarbyl phosphinic monoacids; diarylphosphinic monoacids; and hydrocarbyl phosphinic acid. From among these classes of active hydrogen compounds some of the particular preferred compounds are phenol, diphenyl acid phosphate, diphenyl phosphonate, dibutyl acid phosphate, didecylacid phosphate and benzoic acid. By "hydrocarbyl" is meant any alphatic, aromatic, or alicyclic moiety containing carbon and hydrogen.

In order for the active hydrogen compound to be effective in the pretreatment step, enough of it should be employed to transform the magnesium, aluminum, their oxides, and organometals. Since the amount of impurities can vary, an excess of the active hydrogen compound is charged into the pretreatment reactor. The excess is normally satisfied by using about the same weight of active hydrogen compound as there is magnesium chloride in the charge. The amount of active hydrogen compound can vary from about 10 percent to about 150 percent of the weight of magnesium chloride; about equal weight is preferred.

The pretreatment with the active hydrogen compound is preferably carried out by the same method and in the same equipment as the activation step which follows. For both pretreatment and activation copulverization is preferred. Copulverization may be carried out in the presence of organic or inorganic pulverization aids which may be simple compounds or polymers. Representative pulverization aids are hexane, heptane, kerosene, boric oxide, silica, aluminum oxide, polyethylene, polystyrene, and organosiloxanes. Of the cited pulverization aids the polysiloxanes, which also have electron-donor properties are preferred. The amount of pulverization aid may range from 1 to 100 of the weight of the charge being milled. The preferred amount of pulverization aid is from 5 to 20 weight percent of the charge.

The pretreatment step of the present invention may be carried out for from about 1 hour to about 10 days. A time of from about 2 to about 5 days is preferred.

After pretreatment, which has the effect of reacting or transforming many impurities in the by-product magnesium chloride, the treated support material comprising magnesium chloride is activated by intimate contact with an electron-donor compound. Preferably this activation is carried out in the same equipment and by the same processing as the pretreatment, but that is not necessary. Pretreatment with an active hydrogen compound and activation with an electron-donor compound preferably are accomplished by copulverization. If desired a compound can be chosen, e.g. phenol or diphenyl phosphate which will have the dual effect of pretreatment and activation simultaneously. A pulverization aid is preferably employed for the activation step, as well as the pretreatment step, but this is not necessary.

The amount of electron-donor compound used in the activation step is from about 0.001 to about 1 mole per mole of the magnesium chloride support. Preferably, about 0.01 to about 0.1 mole electron donor per mole of support material is used.

Electron-donors are compounds, usually but not necessarily organic, containing one or more oxygen, nitrogen, phosphorus, silicon, or sulfur atoms which can form complexes with the magnesium chloride support material. Often the electron donors are termed Lewis bases, since the magnesium chloride is a weak Lewis acid.

Among the classes of compounds containing oxygen suitable for furnishing electron-donors are: aliphatic and aromatic ethers, aliphatic carboxylic esters, aromatic carboxylic esters, cyclic esters of carbonic acid, alcohols, phenols, aldehydes, ketones, aliphatic and aromatic carboxylic acids, lactones, and carboxylic acyl halides. Of these the aromatic carboxylic esters are preferred.

Among the classes of compounds containing nitrogen suitable for furnishing electron-donors are: aliphatic amines and polyamines, aromatic amines, heterocyclic amines, nitriles, carbamates, aromatic isocyanates, and aromatic azo compounds. Electron-donors containing both oxygen and nitrogen atoms may be used such as aliphatic and aromatic amides or nitrocompounds.

Other classes of electron-donors include phosphines, phosphoroamides, sulfides, mercaptans, thioethers, thioesters, organoalkoxysilanes, organoaryloxysilanes, aminosilanes, organosilicon isocyanates, and organopolysilanes, organopolysiloxanes, and polysilazines.

Examples of electron-donor compounds from some of the classes listed above are: ethyl benzoate, ethyl anisate, ethyl toluate, ethyl acetate, diethyl carbonate, γ-butyrolactone, benzoic acid, toluic acids, acetone, acetophenone, nitrobenzene, veratrol, tetramethylenediamine, dimethyl acetamide, methyl carbamate, toluene diisocyanate, benzonitrile, N-methyl pyrrolidone, phenol, and thiophenol. Especially preferred among these electron-donors is ethyl benzoate or an ethyl benzoate.$TiCl_4$ complex.

The electron-donor compound may be placed in the pulverizing apparatus before, during, or after some of the pulverizing time, as long as the support and the electron-donor are intimately contacted during some of the pulverization. More than one electron-donor may be used and the several donors may be added in any convenient fashion. The pulverization aid may also function as an electron-donor.

The activation step by means of intimate contact of the support material with an electron-donor compound may be carried out for any time between about an hour to about 10 days. Preferably the activation step is carried out from about 2 to about 5 days. The activation step may be carried out separately, in conjunction with, or partially in conjunction with the pretreatment step. For both pretreatment and activation of the support material copulverization is preferred.

After pretreatment and activation the magnesium chloride support material of the present invention may be sieved. The preferable particle size for the support material is that fraction passing through a 140-mesh screen.

The third major step in the process of this invention is reaction of the magnesium chloride with a titanium compound in order to prepare the titanium component of the coordinate complex polymerization catalyst.

The titanium compound employed for the reactive step may be represented by the formula:

$$\text{Ti } X_n (OR')_p (NR^2R^3)_q (OCOR^4)_r$$

wherein X is a chlorine, bromine, or iodine atom; $R'$, $R^2$, $R^3$, and $R^4$ may be the same or different and are hydrocarbyl radicals having from 1 to about 12 carbon atoms; n is a number from 1 to 4; p, q, and r are numbers from 0 to 3, and $n+p+q+r$ is preferably 4, but may be 3.

Some examples of titanium halocompounds useful in performing the reactive step are titanium tetrachloride, titanium tetrabromide, titanium tetraiodide, methoxytitanium trichloride, dimethoxy-titanium dichloride, ethoxytitanium trichloride, dimethylaminotitanium trichloride, bis(dimethylamino) titanium dichloride, titanium benzoate trichloride, and titanium trichloride material. Preferably the reactive titanium compound is a liquid, but this is not necessary if a convenient, inert solvent can be found for the reagent. The titanium compound can be employed neat or in a suitable solvent. The ratio of titanium compound to magnesium support material can range from 0.1 to 1 molar.

The titanium reaction can be carried out at any temperature from about 25° to about 200° C., but temperatures from about 75° to about 150° C. are preferred. This reaction can be carried out from a few minutes to several hours, but a reaction time of ½ to 4 hours is preferred.

After the pretreatment, activation, and treatment with a titanium halide the titanium component supported on magnesium chloride is preferably separated from the liquid medium, washed with an inert solvent, such as heptane, and dried, preferably by vacuum drying at ambient temperature. Because this supported titanium catalyst component is sensitive to air and moisture, it should be stored in a dry, inert atmosphere.

The titanium catalyst component supported on the magnesium chloride of the present invention may be used along with a suitable organoaluminum compound as a catalyst system for the polymerization of olefins such as ethylene, propylene, butene, and butadiene, or copolymers of these olefins with each other and other olefins in the heterogeneous type (Ziegler-Natta) of polymerization in conventional fashion, as is well-known. This polymerization is illustrated in the Examples. The molar ratio of organoaluminum compound to titanium in the magnesium chloride supported titanium component of the present invention may range from about 2000:1 to about 0.5:1; the preferred molar ratio is from about 200:1 to about 100:1. It is preferable to add to the catalytic system also an electron-donor compound for the organoaluminum compound in a molar ratio from about 5:1 to about 2:1. The preferred electron-donor compounds for the organoaluminum compound are aromatic carboxylic esters, such as methyl toluate or ethyl anisate.

The organoaluminum compounds may be selected from the following:

Trialkyl aluminums such as triethylaluminum, triisobutylaluminum, and trihexylaluminum; dialkyl aluminum halides such as diethylaluminum chloride, diethylaluminum bromide, and dibutylaluminum chloride; alkylaluminum sesquihalides such as ethylaluminum sesquichloride; alkylaluminum dihalides such as ethylaluminum dichloride, ethylaluminum difluoride and butylaluminum dichloride; and dialkylaluminum alkoxides such as diethylaluminum ethoxide, diethylaluminum butoxide, and diethylaluminum phenoxide.

In addition to its use as a support material for polymerization catalysts, the improved magnesium halide of the present invention has many other uses. Magnesium bromide may be used as a fire-retardant. Magnesium fluoride may be employed in toothpaste as an anticavity reagent. Magnesium chloride may be used in the electrolytic production of magnesium metal. Magnesium chloride may be used also in the preparation of cements for wall plaster compositions or flooring along with calcined magnesium oxide, fine aggregate, and a fibrous filler such as asbestos or wool fibers. A solution of magnesium chloride may be used as a defoliant.

Having described the present invention above, we now illustrate the aspect of it dealing with catalysis of polymerization in the following Examples. These Examples, however, do not limit the present invention to that one use, nor even describe completely all the facets of that one use. Other ways for carrying out the present invention may still be within the scope of this disclosure.

EXAMPLE 1

This Example illustrates the preparation of a titanium catalyst component supported by the improved magnesium chloride of the present invention.

Into a 1-liter, stainless steel ball mill were placed 10 g of 87 percent $MgCl_2$ from the manufacture of magnesium alkyls containing 6 percent magnesium and 6.8 percent of MgO, $R_2Mg$, Al, $Al_2O_3$ combined, with a surface area of 92 m²/g. Also added to the ball mill were 12.5 g diphenyl acid phosphate, 1.2 g silicone oil (General Electric Co., SF 96-100), and 1.2 kg of 1.6-cm (⅝ inch) diameter stainless steel balls. The mill was then rotated at ambient temperature for 5 days at about 110 rpm.

After this pretreatment 5.3 g $TiCl_4$·ethyl benzoate complex was introduced into the mill and milling was continued for an additional 2 days. The activated product was then sieved through a 140-mesh screen.

About 5 g of the sieved product was then suspended in 10 ml heptane in a 250-ml, 3-necked flask equipped with a magnetic stirrer and a thermometer. Sixty ml. $TiCl_4$ was added and the suspension heated to 100° C. for 1 hour. The suspension was then filtered, washed several times with heptane, and vacuum-dried.

EXAMPLE 2

This Example illustrates standard test conditions for slurry polymerization, one of the techniques for utilizing the present invention.

A polymerization reactor in the form of a four-liter, jacketed autoclave was equipped with a heater, purging ports, thermocouple, and mechanical stirrer. It was charged with two liters of dry heptane and brought to 50°±5° C. A nitrogen purge was commenced, and a weighed quantity of the organoaluminum compound was added by syringe and stirred for about 10 seconds. Then a weighed amount of the electron donor was added through the entry port, and the reaction mixture stirred for about 10 seconds again. At this point the solid titanium component of the catalyst system, as made in Example 1, was added. Polymer-grade propylene was then pumped into the reactor until a pressure of 10 atmospheres was reached at 65° C. During the polymerization more propylene was added to maintain the pressure at 10 atmospheres at 65° C. for 1½ hours, the duration of the standard test.

After the 1½ hour standard test the polymer was filtered, washed with isopropyl alcohol, oven-dried at 70° C., and weighed, thus giving a weight termed Dry Polymer. In order to determine the amount of heptane-soluble polymer formed the reaction solvent filtrate was evaporated to dryness.

EXAMPLE 3

This Example illustrates standard test conditions for bulk polymerization, another technique for utilizing the present invention.

As in Example 2, a 2.8 l. jacketed autoclave was equipped with a heater, purging ports, thermocouple, and mechanical stirrer. The nitrogen purge, addition of organoaluminum compound, electron donor, and titanium component of the present invention was carried out as in Example 2. Then 2 l. of liquid propylene was added and brought to 70° C. Again the standard polymerization test was run for 1½ hours. At the end of the polymerization time excess propylene was vented from the reactor. The polymer was collected, dried at 70° C., and weighed to give the amount of Dry Polymer.

For both the slurry test of Example 2 and the bulk polymerization of Example 3, the activity of the titanium component of the present invention was defined as follows:

$$\text{Activity}\left(\frac{\text{g polymer}}{\text{g catalyst component}}\right) = \frac{\text{Dry Polymer (g) plus Heptane-Soluble Polymer (g)}}{\text{Titanium Component (g)}}$$

The amount of polymer insoluble in heptane was determined by a three-hour extraction at the boiling point of heptane and termed "$C_7$". Isotactic Index (II) percentage was then defined as:

$$II = \frac{\text{"}C_7\text{"} \times \text{Dry Polymer (g)}}{\text{Total Polymer Produced (g)}} \times 100$$

EXAMPLE 4

This Example illustrates the use of the catalyst component prepared in Example 1, to polymerize propylene in a slurry, as described in Example 2.

The procedure of Example 2 was followed employing the following catalytic components: 80 mg of the titanium component, prepared in Example 1, and 12 mmol triethylaluminum complexed with 3 mmol methyl p-toluate. The polymerization test results indicated an activity of 5396 g polymer/titanium component, and an Isotactic Index (II) of 92.1 percent.

EXAMPLE 5

This Example illustrates a further embodiment of the present invention.

A titanium catalyst component was prepared employing the same equipment and procedure as in Example 1. As the active hydrogen compound 11.2 g of phenol was copulverized with a 8.0 g. sample of the same $MgCl_2$. The milling took place with 1 kg. stainless steel balls. The activation and treatment steps were the same as in Example 1.

The same equipment and procedure as in Example 2 was employed to test the catalyst component for the slurry polymerization of propylene with the following results: activity, 6223 g polymer/g.titanium component; II 91 percent.

COMPARATIVE EXAMPLE 1

This Example illustrates the comparatively inferior result when the by-product magnesium chloride is activated without either the post-treatment step or the pretreatment step of the present invention.

As in Example 1, 20 g of the same by-product magnesium chloride was ball-milled for two days at ambient temperature with 5.5 g of $TiCl_4$.ethyl benzoate complex using 875 g of 1.6-cm diameter balls. After sieving through a standard 140-mesh screen, 23 g resulted. A 0.05 g aliquot of this material was used as the titanium component in the standard slurry polymerization, as in Example 2. The results were 2065 g/g titanium component activity and 31.5 percent Isotactic Index with 8 mmol triethylaluminum (TEAL) as the cocatalyst. When the cocatalyst system was 12 mmol of TEAL and 3 mmol of methyl toluate combination, the activity dropped to less than 1000 and the II was 85 percent.

Another sample of the by-product $MgCl_2$ was premilled for five days without an active hydrogen compound and then activated as above. Upon testing in the standard propylene polymerization the results for this titanium component were: activity 1253 g/g; isotactic index 35 percent.

COMPARATIVE EXAMPLE 2

This Comparative Example illustrates the polymerization result obtained when a pure $MgCl_2$ is the starting material but, as in Comparative Example 1, only activation without pretreatment of post-treatment is carried out.

A 20-g sample of laboratory-grade, anhydrous $MgCl_2$ (Alfa Inorganics Div., Ventron Corp., Danvers, Mass.) was milled for five days with 5.5 g $TiCl_4$.ethyl benzoate complex, as in Comparative Example 1. Using this as a titanium catalyst with 8 mmol of TEAL as cocatalyst gave an activity of 5799 g/g and an II of 40 percent. Another polymerization of propylene employing 12 mmol TEAL and 4 mmol methyl p-toluate produced an activity of 2857 g/g and an II of 90 percent.

COMPARATIVE EXAMPLE 3

This Comparative Example illustrates the effect of adding the post-treatment step to the activation step, for by-product MgCl₂ but still omitting the pretreatment step of the present invention.

The same titanium component as in Comparative Example 1 was further treated with TiCl₄ as in Example 1, separated, washed with heptane, and vacuum-dried. Employing the same cocatalyst system as in Example 4 resulted for the standard slurry polymerization, as in Example 2, in an activity of 1381 and an II of 88 percent.

I claim:

1. A process for refining magnesium halides containing about 5 percent or more magnesium metal which includes the step of treating the magnesium halide with an active hydrogen compound in order to transform substantially the elemental magnesium to the magnesium salt of the active hydrogen compound.

2. The process of claim 1 wherein the magnesium halide is magnesium chloride.

3. The process of claim 1 wherein the active hydrogen compound has a pKa from about 2 to about 10.

4. The process of claim 1 wherein the active hydrogen compound includes a phenol.

5. The process of claim 1 wherein the active hydrogen compound includes a organic acid phosphate.

6. The process of claim 1 wherein the treatment is carried out by copulverization.

7. In a process for preparing a catalytic system for polymerizing olefins comprising:
(a) a component containing titanium halide obtained by:
  (i) activating a support material comprising magnesium chloride with an electron donor to make an activated product, and
  (ii) treating the activated product with a titanium halide to form the titanium halide component, and
(b) a component containing an organoaluminum compound, the improvement comprising pretreating the support material comprising magnesium chloride containing about 5 percent or more magnesium metal with an active hydrogen compound in order to transform substantially the elemental magnesium to the magnesium salt of the active hydrogen compound.

8. The process of claim 7 wherein the original amount of elemental magnesium is from about 5 to about 15 percent by weight of the magnesium chloride.

9. The process of claim 7 wherein the active hydrogen compound is an organic acid phosphate.

10. The process of claim 7 wherein the active hydrogen compound is a phenol.

11. The process of claim 7 wherein the active hydrogen compound has a pKa from about 2 to about 10.

12. The process of claim 7 wherein the activation is carried out by copulverization.

13. The process of claim 12 wherein the copulverization is ball milling.

14. The process of claim 7 wherein the electron donor is a complex of a carboxylic ester and a titanium halide.

15. The process of claim 14 wherein the complex is ethyl benzoate.TiCl₄.

16. The process of claim 7 wherein the titanium halide is titanium tetrachloride.

17. The process of claim 7 wherein the titanium halide is titanium trichloride material.

18. The process of claim 7 wherein the activated product comprises about one percent by weight of elemental magnesium or less.

19. The product of the process of any one of claims 1 through 18.

20. In a process for preparing a component containing titanium halide for a catalytic system for polymerizing olefins comprising:
(a) a component containing titanium halide obtained by:
  (i) activating a support material comprising magnesium chloride with an electron donor to make an activated product, and
  (ii) treating the activated product with a titanium halide to form the titanium halide component,
the improvement comprising pretreating the support material comprising magnesium chloride containing about 5 percent or more magnesium metal with an active hydrogen compound in order to transform substantially the elemental magnesium to the magnesium salt of the active hydrogen compound.

21. The process of claim 20 wherein the original amount of elemental magnesium is from about 5 to about 15 percent by weight of the magnesium chloride.

22. The process of claim 20 wherein the active hydrogen compound is an organic acid phosphate.

23. The process of claim 20 wherein the active hydrogen compound is phenol.

24. The process of claim 20 wherein the active hydrogen compound has a pKa from about 2 to about 10.

25. The process of claim 20 wherein the activation is carried out by copulverization.

26. The process of claim 25 wherein the copulverization is ball milling.

27. The process of claim 7 wherein the electron donor is a complex of a carboxylic ester and a titanium halide.

28. The process of claim 27 wherein the complex is ethyl benzoate.TiCl₄.

29. The process of claim 20 wherein the titanium halide is titanium tetrachloride.

30. The process of claim 20 wherein the titanium halide is titanium trichloride material.

31. The process of claim 20 wherein the activated product comprises about one percent by weight of elemental magnesium or less.

32. The product of the process of any one of claims 20 through 31.

* * * * *

UNITED STATES PATENT AND TRADEMARK OFFICE
CERTIFICATE OF CORRECTION

PATENT NO. : 4,382,019

DATED : May 3, 1983

INVENTOR(S) : Carl C. Greco

It is certified that error appears in the above—identified patent and that said Letters Patent is hereby corrected as shown below:

Col. 2, line 51, "Hithereto" should be -- Hitherto --.

Col. 8, line 54, "of" should be -- or --.

Signed and Sealed this

Eleventh Day of October 1983

[SEAL]

Attest:

Attesting Officer

GERALD J. MOSSINGHOFF

Commissioner of Patents and Trademarks